US012659864B2

(12) United States Patent
Chiu et al.

(10) Patent No.: US 12,659,864 B2
(45) Date of Patent: Jun. 16, 2026

(54) SYSTEMS AND METHODS FOR BAND-BASED POWER SAVING IN A WIRELESS NETWORK

(71) Applicant: Verizon Patent and Licensing Inc., Basking Ridge, NJ (US)

(72) Inventors: Chin Chiu, Allen, TX (US); Sachin Vargantwar, Cumming, GA (US); Farid Khafizov, Plano, TX (US); Asif Dawoodi Gandhi, Edison, NJ (US)

(73) Assignee: Verizon Patent and Licen sing Inc., Basking Ridge, NJ (US)

( * ) Notice: Subject to any disclaimer, the term of this patent is extended or adjusted under 35 U.S.C. 154(b) by 406 days.

(21) Appl. No.: 18/307,877

(22) Filed: Apr. 27, 2023

(65) Prior Publication Data

US 2024/0365234 A1 Oct. 31, 2024

(51) Int. Cl.
*H04W 52/02* (2009.01)
*H04W 72/54* (2023.01)
*H04W 72/563* (2023.01)

(52) U.S. Cl.
CPC ....... *H04W 52/0235* (2013.01); *H04W 72/54* (2023.01); *H04W 72/563* (2023.01)

(58) Field of Classification Search
CPC H04W 52/0235; H04W 72/54; H04W 72/563
See application file for complete search history.

(56) References Cited

U.S. PATENT DOCUMENTS

2016/0044538 A1* 2/2016 Aksu ..................... H04W 36/22
370/235
2024/0172068 A1* 5/2024 Roopesh ........... H04W 36/0085

* cited by examiner

*Primary Examiner* — Marcos L Torres

(57) ABSTRACT

A system described herein may identify a set of radio frequency ("RF") bands implemented by a particular base station of a RAN of a wireless network. The system may identify a first measure of hand-ins, associated with a particular time period, to the base station via a first RF band of the set of bands, and identify a second measure of hand-ins, associated with the particular time period, to the base station via a second RF band of the set of bands. The system may rank the first and second RF bands based on the respective associated first and second measures of hand-ins, select a particular RF band based on the ranking, and may cause the particular base station to implement, during the particular time period, a power saving technique with respect to the selected particular RF band.

20 Claims, 9 Drawing Sheets

| Band | Predicted load @ time $t$ | Power save policies | Predicted hand-ins @ time $t$ |
|------|---------------------------|---------------------|-------------------------------|
| Band_1 | [High] | [May be slept] | 12 |
| Band_2 | [Low] | [May not be slept] | 37 |
| Band_3 | [Low] | [May be slept] | 999 |
| Band_4 | [Low] | [May be slept] | 20 |

| Power save priority | Band | Predicted hand-ins @ time *t* |
|---|---|---|
| 1 | Band_4 | 20 |
| 2 | Band_3 | 999 |

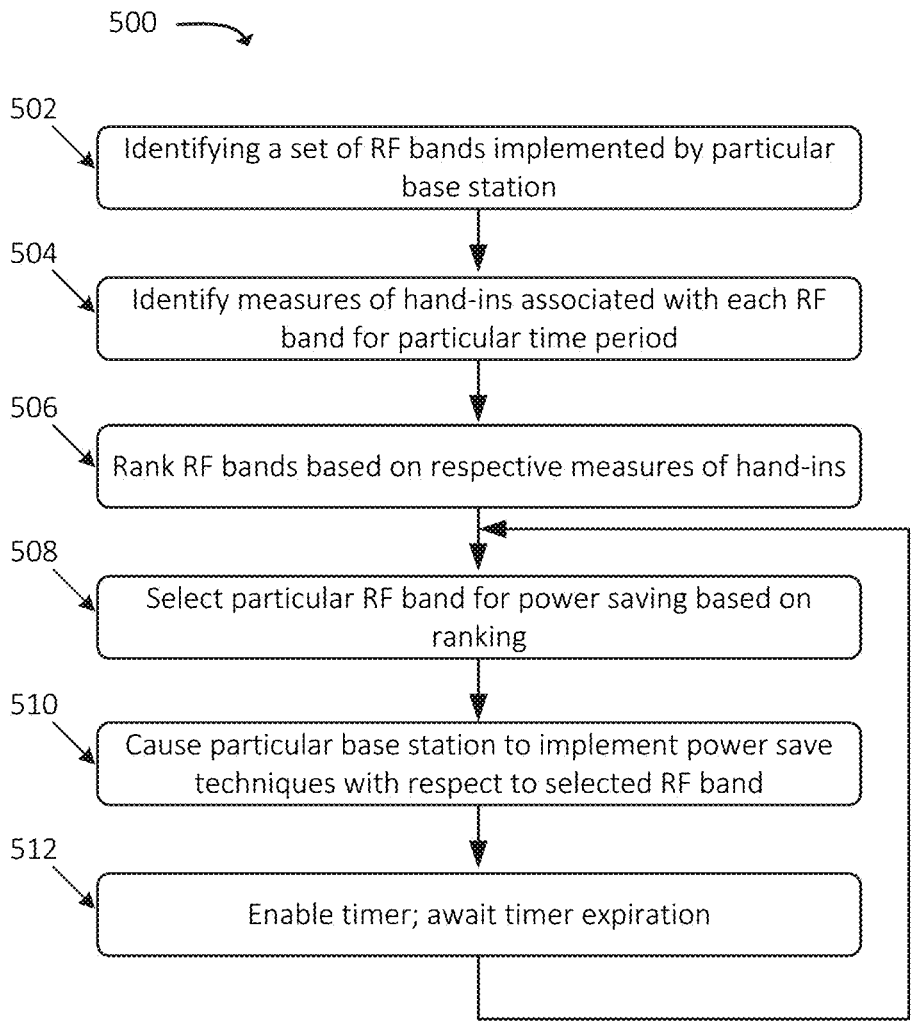

500

502 — Identifying a set of RF bands implemented by particular base station

504 — Identify measures of hand-ins associated with each RF band for particular time period 506 — Rank RF bands based on respective measures of hand-ins 508 — Select particular RF band for power saving based on ranking 510 — Cause particular base station to implement power save techniques with respect to selected RF band 512 — Enable timer; await timer expiration

Output component

950

Input component

940

Memory

930

Bus
910

Communication
interface

960

Processor

920

SYSTEMS AND METHODS FOR BAND-BASED POWER SAVING IN A WIRELESS NETWORK

BACKGROUND

Wireless networks may provide wireless connectivity to User Equipment ("UEs"), such as mobile telephones, tablets, Internet of Things ("IoT") devices, Machine-to-Machine ("M2M") devices, or the like. Some wireless networks may utilize multiple frequency bands, such as a Sub-6 GHz band, a millimeter-wave ("mmWave") band, a Mid-band, and/or other frequency bands. Different bands may be associated with different performance characteristics, power consumption characteristics, coverage characteristics, and/ or other differentiating characteristics. Certain locations may receive wireless coverage according to multiple frequency bands. Additionally, some wireless networks may offer Multiple-Input Multiple-Output ("MIMO") connectivity, in which a given band is implemented by multiple antennas or other types of wireless network infrastructure.

BRIEF DESCRIPTION OF THE DRAWINGS

FIG. 5 illustrates an example process for selecting a frequency band on which to implement power saving techniques, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for band-based power saving techniques in a wireless network in which multiple different RF bands (referred to herein simply as "bands" for the sake of brevity) are implemented by particular discrete sets of wireless network infrastructure, such as base stations of one or more RANs. As discussed herein, a particular base station may identify a particular band for which power saving techniques should apply. Such power saving techniques may include powering down antennas, radios, etc. that implement the particular band, implementing "sleep" techniques with respect to the particular band, and/or other suitable techniques. In accordance with some embodiments, the base station may select the particular band based on factors such as a measure of load associated with the particular band (e.g., an actual or predicted measure of load, where such predicted measure of load may be determined via artificial intelligence/machine learning ("AI/ ML") techniques or other suitable techniques), a measure of hand-ins to the particular band (e.g., handovers from other base stations), and/or other suitable factors. By taking into account the measure of hand-ins to the particular band, embodiments described herein may minimize the potential for service disruptions for UEs that receive service via the particular band. For example, handover procedures that include handing in UEs, that were connected to another base station via a different band, may disrupt service for such UEs in a more perceivable manner (e.g., impacting the user experience) than handing in UEs to the same band. As such, embodiments described herein, that minimize such disruptions, may result in an enhanced user experience while saving power consumed by the network.

Figure 1:
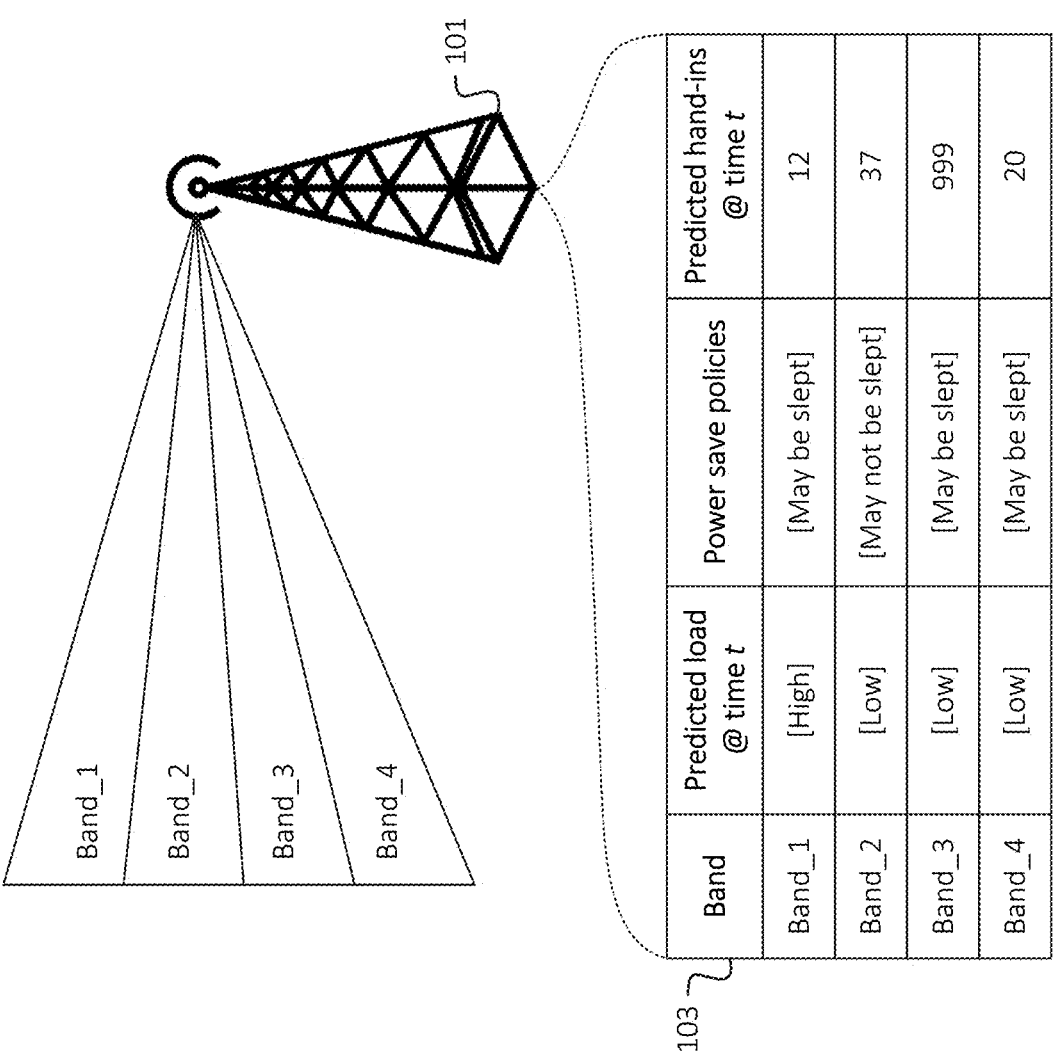
FIG. 1 illustrates an example overview of information that may be used in or more embodiments described herein.

As shown in FIG. 1, example base station 101 base station may implement multiple bands, represented as Band_1, Band_2, Band_3, and Band_4. Base station 101 may, for instance, include one or more antennas, radios, etc. that wirelessly send and/or receive traffic via the example bands. While four example bands are described in the examples presented herein, similar concepts may apply to implementations in which a different quantity of bands are implemented by base station 101. Further, while embodiments are described in the context of bands, similar concepts may apply to different radio access technologies ("RATs"), such as a Long-Term Evolution ("LTE") RAT, a Fifth Generation ("5G") RAT, etc., and/or bands that are associated with different RATs. Further, as discussed below, concepts described herein may apply to MIMO implementations, in which base station 101 utilizes multiple antennas, radios, etc. to wirelessly send and/or receive traffic via a given band.

As shown, base station 101 may receive or maintain information, represented as data structure 103, that may be used to select one or more bands for which a power saving technique should be applied, in accordance with some embodiments. In some embodiments, a RAN controller and/or suitable device or system that is included in or is communicatively coupled to base station 101 may receive, provide, and/or maintain some or all of the information shown in data structure 103. In some embodiments, some or all of the information shown in data structure 103 may be generated or determined by base station 101 and/or a RAN controller associated with base station 101. In some embodiments, some or all of the information shown in data structure 103 may be directly or indirectly received from some other device or system, such as a Network Data Analytics Function ("NWDAF"), a Policy Control Function ("PCF"), an Access and Mobility Management Function ("AMF"), etc.

In some embodiments, as discussed below, base station 101 may determine whether to apply power saving techniques on a periodic basis (e.g., every 30 minutes, every hour, etc.), an event-driven basis (e.g., based on detecting one or more events such as scheduled events including sports games or concerts, seasonal holidays, rush hour commutes, working hours in an office building, etc.), and/or on some other suitable basis. In the examples provided herein, base station 101 may utilize the example information represented in data structure 103 to determine whether to apply power saving techniques, and/or to select band(s) to which such power saving techniques should be applied, at a given future time t.

While referred to as "a time," time t may include or may otherwise refer to a time window, such as a 1-second time window, a 30-second time window, a 30-minute time window, a 1-hour time window, etc. In some embodiments, the duration of such time window may be determined using AI/ML techniques, such as determining the length of a triggering event or condition (e.g., time t may refer to the duration of a scheduled sporting event, the duration of a workday, the duration of a rush hour commute, etc.).

Data structure 103 may include, for each band implemented by base station 101, a measure of predicted load at time t, one or more power save policies, predicted hand-ins at time t, and/or other suitable information. As discussed above, the "predicted" measures may be determined using AI/ML techniques, which may be based on an analysis of historical usage patterns associated with base station 101. In this sense, different base stations may have different historical usage patterns or other different attributes or features, based on which such predicted measures may be different.

The measure of predicted load at time t for a given band implemented by base station 101 may include an amount of uplink and/or downlink throughput via the given band, a quantity of UEs connected to base station 101 via the given band, a proportion of used and/or available Physical Resource Blocks ("PRBs") associated with base station 101 via the given band, and/or other suitable measures of load. As discussed above, data structure 103 may include information in addition to or in lieu of load information, such as performance or quality of experience information (referred to herein simply as "performance information" for the sake of brevity). Performance information for a given band may include, for example, measures of throughput, measures of latency, an indication of whether Service Level Agreements ("SLAs") were met for UEs receiving access via the particular band, etc.

In this example, load metrics are represented as "high" or "low" for the sake of simplicity. For example, a "high" measure of load may represent a relatively high (e.g., greater than a threshold or some other reference value) utilization of RF resources associated with a particular band, a relatively high quantity of UEs connected via the particular band, etc. On the other hand, a "low" measure of load may represent a relatively low utilization of RF resources associated with a particular band, a relatively low quantity of UEs connected via the particular band, etc. In practice, the load metrics may be reflected as different labels or categories, scores, raw values, or other suitable representations.

Data structure 103 may also indicate power save policies for a given band. The power save policies may indicate particular power saving techniques that may be used for each band, and/or whether power save techniques may be applied at all for each band. The power save policies may be specified by a network operator associated with base station 101. Additionally, or alternatively, base station 101 and/or some other suitable device or system may utilize automated techniques, such as AI/ML techniques, to generate or modify the power save policies. In some embodiments, different power save policies may be applicable to different times or time periods. For example, a particular band may be associated with one power save policy during a first time period (e.g., during a weekend or weekday evenings) and may be associated with a different power save policy during a second time period (e.g., during weekday mornings and afternoons).

The power save policies are represented in this example as "may be slept" or "may not be slept" for the sake of simplicity. For example, a "may be slept" policy may indicate that antennas, radios, or other hardware that implement a particular band. On the other hand, a "may not be slept" policy may indicate that such hardware may not be slept, may not be put into a power saving mode, may not be powered down, etc. Certain bands may, for instance, be considered a "fallback" or "failsafe" band, or may otherwise be indicated or determined as bands that should not be subject to power saving techniques. In some embodiments, the power save policies may include other suitable information, such as types of power save techniques, conditions under which particular power save techniques are permitted or preferred, etc.

The predicted hand-ins shown in data structure 103 may refer to a quantity or other measure of hand-ins to base station 101 via particular bands at time t (e.g., during a time period denoted as time t). For example, Band_1 may be associated with a relatively lowest quantity of predicted hand-ins at time t (i.e., 12 predicted hand-ins), while Band_3 may be associated with a relatively highest quantity of predicted hand-ins at time t (i.e., 999 predicted hand-ins). The indicated hand-ins, for a given band during a given time period, may refer to hand-ins from another base station, cell, etc. via the same band. Additionally, or alternatively, the hand-ins for the band during the time period may refer to hand-ins from another base station, cell, etc. via a different band. Further, in some embodiments, the hand-ins for the band during the time period may refer to hand-ins from another band implemented by the same base station 101.

As discussed above, the predicted hand-ins may be determined using predictive and/or modeling techniques, such as AI/ML techniques, or other suitable techniques. The predicted hand-ins may be based on historical information, attributes of base station 101 and/or a location at which base station 101 is located, and/or other suitable information. The predicted hand-ins may refer to handovers from other base stations to base station 101, via the particular band. For example, a particular hand-in associated with Band_1 may refer to a UE that was connected to a different base station via Band_1 (e.g., which may be a neighbor of base station 101 and/or may have overlapping coverage with base station 101), and that moved toward a coverage area associated with base station 101 (e.g., moved away from the other base station). Additionally, or alternatively, Band_1 of the other base station may have become congested, and the UE may connect to (e.g., hand into or be handed into) base station 101 to continue receiving service via Band_1. In practice, other scenarios may occur in which UEs are handed in from other base stations to base station 101 to continue receiving service via the same band.

Figure 2:
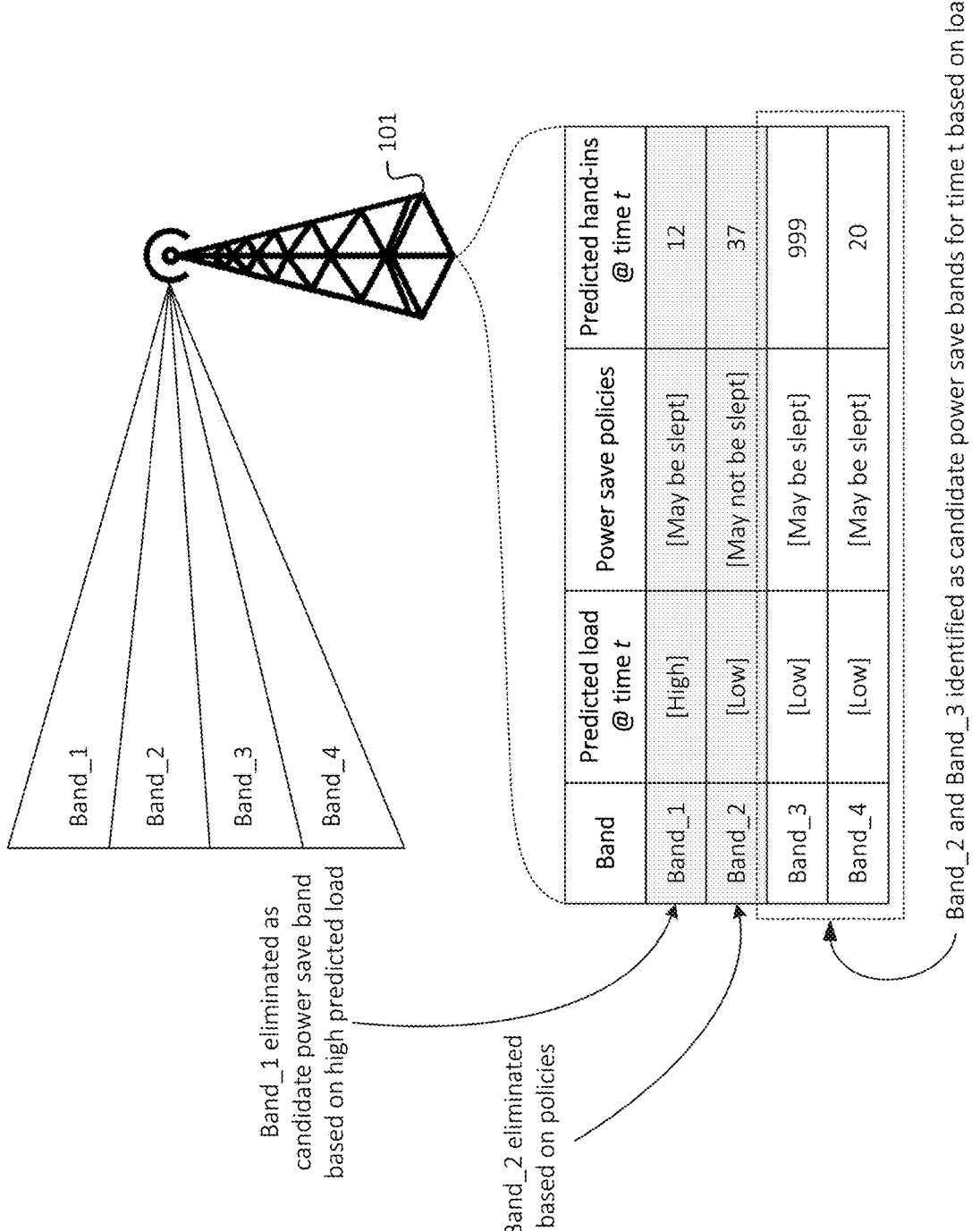
FIGS. 2 and 3 illustrate an example selection of a frequency band on which to implement power saving techniques, in accordance with some embodiments.
Figure 3:
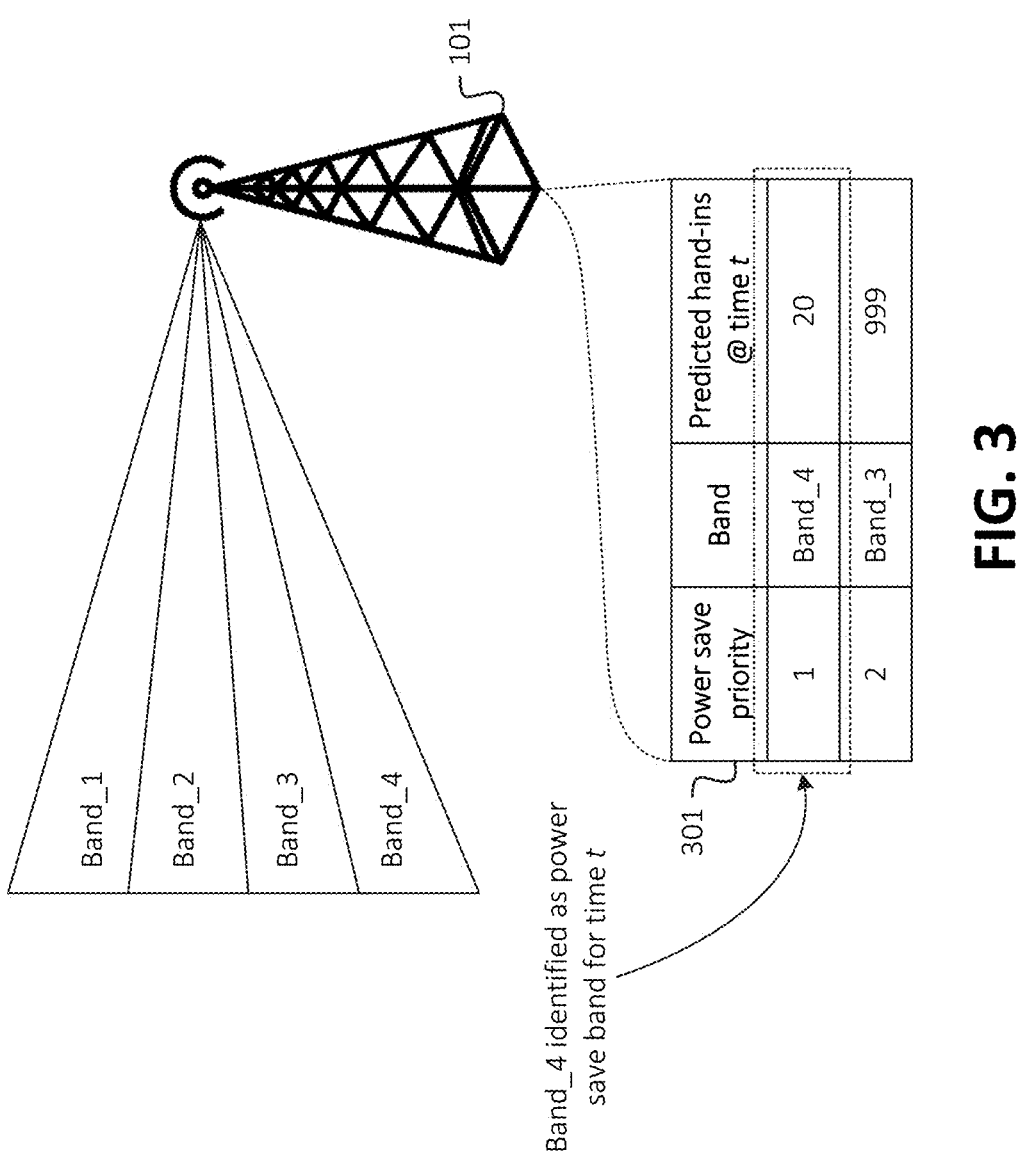

FIGS. 2 and 3 illustrate an example selection procedure in which base station 101 (and/or some other device or system, such as a RAN controller associated with base station 101) selects a particular band for which power saving techniques should be implemented. As shown in FIG. 2, base station 101 may identify candidate bands for implementing power saving techniques, and/or may identify bands that are not candidates for implementing power saving techniques. As shown, for example, base station 101 may identify that Band_1 is not candidate for implementing power saving techniques (e.g., Band_1 may be eliminated as a potential power save band) based on predicted load associated with Band_1 at time t. That is, even though the power save policies for Band_1 indicate that Band_1 is permitted to be slept (and/or that power saving techniques are otherwise permitted for Band_1), Band_1 may still be eliminated from consideration for power saving at time t based on the high predicted load at time t. For example, since the predicted load for this band is relatively high, the user experience impact from implementing power saving techniques on this band may be relatively high or unacceptable.

As further shown, Band_2 may be eliminated as a potential candidate for implementing power saving based on the power save policies for Band_2. Even though the predicted load at time t via this band is relatively low, Band_2 may still be ineligible for power saving based on the power save policies.

On the other hand, Band_3 and Band_4 may be identified as candidate power save bands based on the relatively low predicted load at time t via these bands, as well as the power save policies indicating that these bands may be slept at time t. As referred to above, other information may be used to evaluate whether a given band is a candidate power save band (or should be eliminated as a candidate power save band), such as performance metrics or other suitable information.

FIG. 3 illustrates example data structure 301, which includes the candidate power save bands identified above (i.e., Band_3 and Band_4, in this example). In some embodiments, base station 101 may rank, prioritize, etc. the candidate power save bands based on the predicted hand-ins for each respective candidate power save band and/or other suitable factors. In this example, base station 101 may identify that Band_4 is associated with a higher power save priority, score, etc. based on having a lower quantity of predicted hand-ins at time t than Band_3. That is, the higher power save priority of Band_4 may reflect that the impact (e.g., performance impact, user experience impact, etc.) of implementing power saving techniques at Band_4 may be lower than implementing power saving techniques at Band_3. In this example, a predicted 20 hand-ins, that would occur with respect to Band_4 of base station 101 at time t may be redirected to other bands, which may potentially provide a disruption to the UEs participating in these hand-ins. However, redirecting these 20 hand-ins would provide a lower overall impact than redirecting the 999 predicted hand-ins for Band_3. As such, base station 101 may select Band_4 for implementing power save techniques.

In some embodiments, base station 101 may further utilize or identify additional factors or thresholds when selecting a particular band for implementing power saving techniques. For example, prior to selecting a particular band for implementing power saving techniques, base station 101 may determine whether the quantity of predicted hand-ins is below a threshold quantity of predicted hand-ins. Such threshold may be useful in situations where a particular band is identified as being associated with the lowest relative impact if the particular band were slept, but where the impact may still be too great. For example, assume that the threshold quantity of predicted hand-ins is 10, reflecting that a network operator has indicated that impacting 10 predicted hand-ins to base station 101 via a particular band is acceptable, but that impacting greater than 10 predicted hand-ins is unacceptable. In such a scenario, even though Band_4 has been identified as being associated with the least relative impact if power saving techniques were implemented, Band_4 may still not be selected as a band for which power saving techniques should be applied (e.g., in this situation, no bands may be selected).

Figure 4:
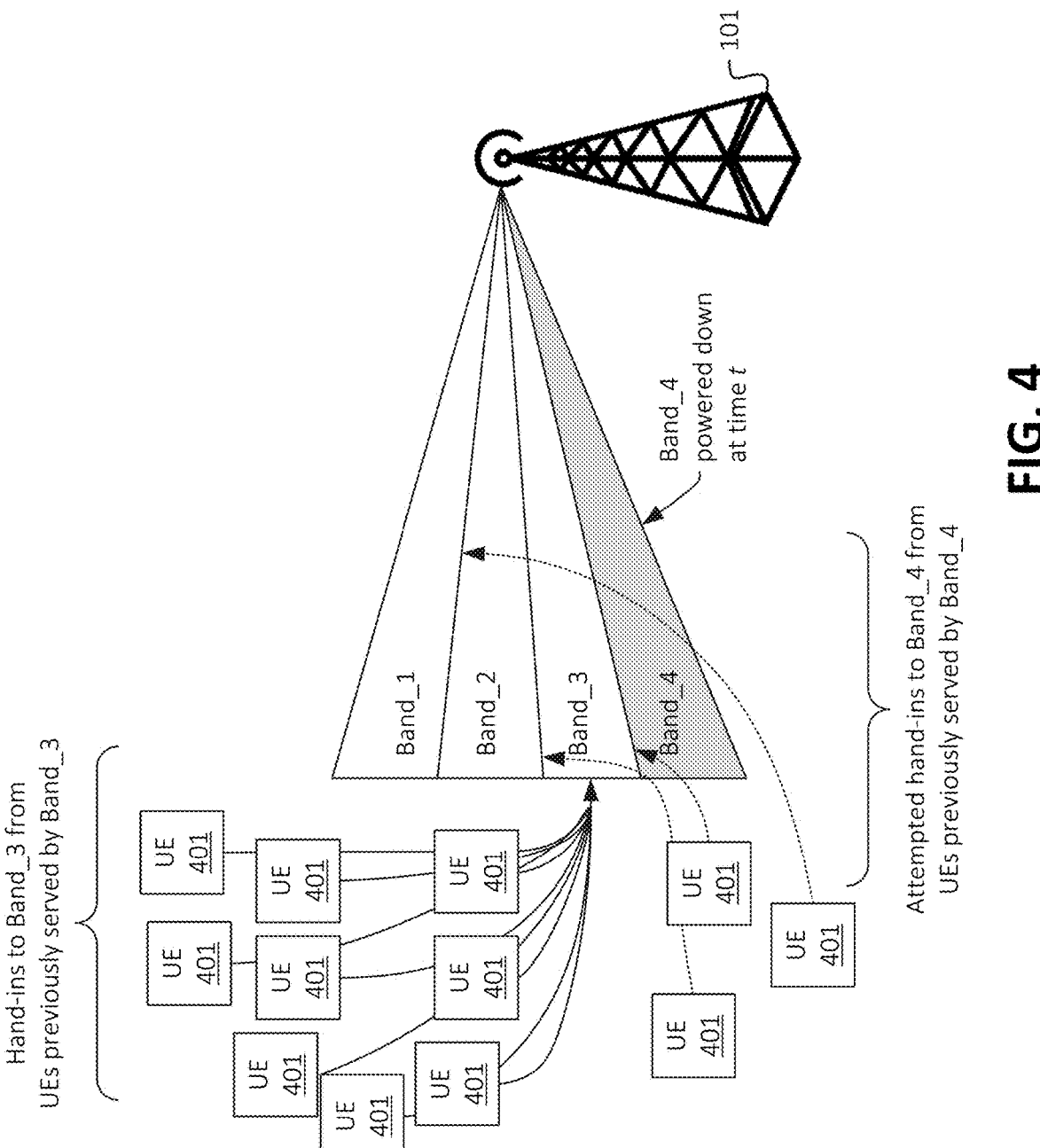
FIG. 4 illustrates an example scenario in which a particular frequency band is selected for a power saving technique, in accordance with some embodiments.

FIG. 4 illustrates an example scenario that may occur once Band_4 has been selected for implementing power saving techniques, such as powering down, sleeping, etc. the band (e.g., powering down, disabling, ceasing transmissions from, etc. antennas, radios, etc. that implement Band_4) at time t. As shown, at time t, a relatively large quantity of UEs 401 may be handed in to base station 101 via Band_3. As discussed above, such UEs 401 may be UEs that were previously served by one or more other base stations (e.g., neighboring base stations) via Band_3, and have connected to (e.g., handed into) base station 101 via Band_3 based on location changes or other factors. Since these UEs 401 are being handed in to the same band as they were previously served by, the impact of the handover may be minimal or otherwise relatively low.

As also shown, other UEs 401, which were previously served by other base stations via Band_4, may attempt to connect to (e.g., may attempt to be handed into) base station 101 via Band_4. Since Band_4 has been powered down (e.g., power saving techniques may be applied with respect to Band_4 of base station 101), these UEs 401 may be redirected to, and/or may otherwise connect to, other bands of base station 101 that have not been powered down. As noted above, selecting a band for power saving based on the quantity of predicted hand-ins to that band may result in an overall improved user experience for UEs 401 that communicate with base station 101, inasmuch as fewer such UEs 401 run the risk of experiencing a service disruption that could potentially be caused by switching bands when connecting to base station 101.

In some embodiments, implementing a power save technique with respect to Band_4 may include, prior to powering down hardware that implements Band_4, providing instructions or messages to UEs that are currently connected to base station 101 via Band_4. Such instructions or messages may cause such UEs to connect to other bands of base station 101 in preparation for the powering down of Band_4. In this manner, such UEs may also avoid service disruptions that may otherwise occur if Band_4 were powered down without such instructions or messages to prepare these UEs for the powering down of Band_4.

While examples are provided above in the context of selecting one band for which power save techniques, similar techniques may apply for powering down multiple bands. For example, while only Band_4 was selected above, in some scenarios, base station 101 may select Band_4 and Band_3 for powering down. In some embodiments, when selecting multiple bands, base station 101 may "stagger" or otherwise iterate the powering down of multiple bands. For example, base station 101 may first power down Band_4, then initiate a timer (e.g., 5 seconds, 30 seconds, and/or some other duration), and upon expiration of the timer, subsequently power down Band_3 (i.e., the next band in the priority or ranking exemplified in data structure 301). Allowing for time in between powering down the multiple bands may prevent the "flooding" of other bands that could potentially otherwise occur if multiple bands were powered down simultaneously. On the other hand, base station 101 may identify that the impact of simultaneously powering down multiple bands may be minimal (e.g., the cumulative load associated with multiple bands may be below a threshold or otherwise relatively low), and may simultaneously power down the multiple bands based on making such a determination.

In some embodiments, the power save techniques referred to above may include modifying a MIMO configuration associated with a given band. For example, "powering down" a band or setting the band to a "low power" mode may refer to powering down some hardware that implements the band, without powering down all hardware that implements the band. For example, as noted above, a MIMO configuration may include multiple antennas, radios, etc. of base station 101 being used to implement the same band. A particular power saving technique for the particular band may include powering down a subset of the antennas, radios, etc. associated with the MIMO configuration, such that the band is still implemented at base station 101 but with reduced hardware (e.g., antennas, transmitters, etc.) implementing the band.

Further, while examples are provided above with respect to applying power saving techniques with respect to particular bands implemented by base station 101, similar concepts may apply with respect to reverting such power saving techniques (e.g., powering hardware, that implements such bands, back on or otherwise reverting the power saving techniques). For example, base station 101 may identify, for Band_4, that predicted load for Band_4 at a future time or time period (e.g., referred to as time t+1) is above a threshold, that power save policies for Band_4 indicate that Band_4 is not permitted to be slept at time t+1, that hand-ins for Band_4 are predicted to increase or are predicted to exceed a threshold at time t+1, etc. Based on identifying some or all of such factors, base station 101 may revert the power saving techniques, such that Band_4 is enabled or is otherwise not in a power saving mode at time t+1. Further, in some embodiments, such power saving techniques may be reverted based on other factors, such as actual or predicted loads associated with other bands implemented by base station 101. For example, if Band_4 has been powered down and a measure of actual or predicted load associated with Band_3 exceeds a threshold, Band_4 may be powered back up in order to alleviate the actual or predicted load on Band_3.

The operations described above may be performed at a per-base station or a per-cell granularity, such that each base station 101 in a RAN that includes multiple base stations 101 may each perform some or all of the above operations (e.g., selectively implementing power saving techniques with respect to particular bands), without needing to communicate with each other or coordinate the selection of bands for power saving. In this manner, the RAN may operate efficiently without the need to add signaling between base stations 101 for the above-described operations, thus conserving network resources and allowing for each base station 101 to determine optimal selections of bands on which to implement power saving techniques. Further, as different factors or policies may apply to different base stations 101, each base station 101 may be able to operate according to such factors or policies, while saving power and preserving UE performance.

FIG. 5 illustrates an example process 500 for selecting one or more bands on which to perform power saving techniques. In some embodiments, some or all of process 500 may be performed by base station 101. In some embodiments, one or more other devices may perform some or all of process 500 in concert with, and/or in lieu of, base station 101, such as a RAN controller or other suitable device or system. As discussed above, a particular base station 101 may perform some or all of process 500 for various times or time periods, which may be determined based on a schedule, determined based on predicted events, and/or in some other suitable manner. As also discussed above, different base stations 101 may each perform some or all of process 500 either concurrently or asynchronously, in order to determine optimal selections of bands on which power save techniques should be applied based on metrics associated with each respective base station 101.

As shown, process 500 may include identifying (at 502) a set of RF bands implemented by a particular base station 101. For example, base station 101 may identify two or more RF bands that via which base station 101 provides wireless service. In some embodiments the two or more RF bands may be implemented by distinct sets of hardware, and/or may operate partially or in full via a shared set of hardware.

Process 500 may further include identifying (at 504) respective measures of hand-ins associated with each one of the RF bands for a particular time period. As discussed above, the measures of hand-ins may be determined based on historical information, may be determined using AI/ML techniques, or may be determined in some other suitable manner. In some embodiments, base station 101 may identify other information associated with the RF bands, such as a measure of load for each RF band during the particular time period, a set of power save policies for each RF band during the particular time period, and/or other suitable information. In some embodiments, as discussed above, base station 101 may filter or eliminate RF bands from consideration for power saving techniques based on such information, such as RF bands that are associated with relatively high measures of load for the particular time, RF bands that are associated with policies that prohibit such RF bands from power saving techniques during the particular time, and/or other suitable factors.

Process 500 may additionally include ranking (at 506) the RF bands for power saving based on the respective measures of hand-ins. In some embodiments, base station 101 may select (at 508) a particular RF band based on the RF band being associated with a lowest measure of hand-ins, out of the set of RF bands implemented by the base station. In some embodiments, base station 101 may select the particular RF band based on multiple factors, including the respective measures of hand-ins associated with the RF bands.

Process 500 may further include causing (at 510) base station 101 to implement a power save technique with respect to the selected RF band. For example, base station 101 may output information to UEs 401, that are connected to the selected RF band during the particular time period, indicating that the selected RF band is or will be unavailable during the particular time period. Such UEs 401 may, based on the information, request a connection to other RF bands of base station 101. In some embodiments, base station 101 may also restrict or deny new connections to base station 101 via the particular RF band based on the selection of such RF band for the power save technique. As discussed above, the power save technique may include setting hardware, that implements the selected RF band, to a low power mode, a no power mode, and/or other suitable mode in which less power is consumed with respect to the selected RF band.

Process 500 may additionally include enabling (at 512) a timer based on implementing the power save technique via the particular RF band. For example, as discussed above, process 500 may, after expiration of the timer, include repeating operations 508, 510, and/or 512 in order to implement power save techniques with respect to multiple bands (e.g., to avoid suddenly increasing demand on other RF bands by simultaneously powering down two bands in certain scenarios).

Figure 6:
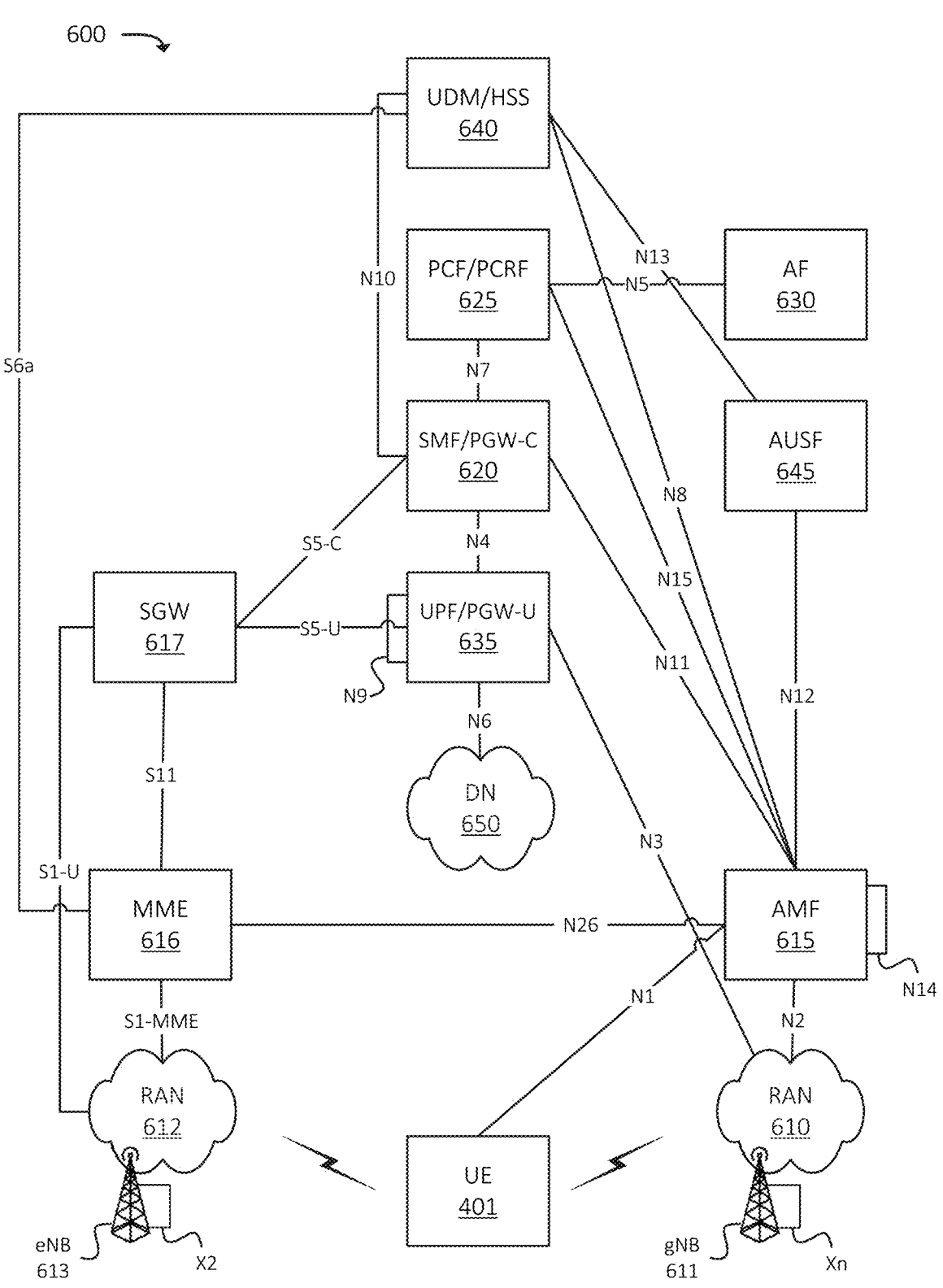
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 401, RAN 610 (which may include one or more Next Generation Node Bs ("gNBs") 611), RAN 612 (which may include one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Unified Data Management ("UDM")/Home Subscriber Server ("HSS") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650).

The example shown in FIG. 6 illustrates one instance of each network component or function (e.g., one instance of SMF/PGW-C 620, PCF/PCRF 625, UPF/PGW-U 635, UDM/HSS 640, and/or AUSF 645). In practice, environment 600 may include multiple instances of such components or functions. For example, in some embodiments, environment 600 may include multiple "slices" of a core network, where each slice includes a discrete and/or logical set of network functions (e.g., one slice may include a first instance of AMF 615, SMF/PGW-C 620, PCF/PCRF 625, and/or UPF/PGW-U 635, while another slice may include a second instance of AMF 615, SMF/PGW-C 620, PCF/PCRF 625, and/or UPF/PGW-U 635). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Elements of environment 600 may interconnect with each other and/or other devices via wired connections, wireless connections, or a combination of wired and wireless connections. Examples of interfaces or communication pathways between the elements of environment 600, as shown in FIG. 6, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 6, such as Service-Based Interfaces ("SBIs"), including an Namf interface, an Nudm interface, an Npcf interface, an Nupf interface, an Nnef interface, an Nsmf interface, and/or one or more other SBIs.

UE 401 may include a computation and communication device, such as a wireless mobile communication device that is capable of communicating with RAN 610, RAN 612, and/or DN 650. UE 401 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 401 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 401 may communicate with one or more other elements of environment 600. UE 401 may communicate with RAN 610 via an air interface (e.g., as provided by gNB 611). For instance, RAN 610 may receive traffic (e.g., user plane traffic such as voice call traffic, data traffic, messaging traffic, etc.) from UE 401 via the air interface, and may communicate the traffic to UPF/PGW-U 635 and/or one or more other devices or networks. Further, RAN 610 may receive signaling traffic, control plane traffic, etc. from UE 401 via the air interface, and may communicate such signaling traffic, control plane traffic, etc. to AMF 615 and/or one or more other devices or networks. Additionally, RAN 610 may receive traffic intended for UE 401 (e.g., from UPF/PGW-U 635, AMF 615, and/or one or more other devices or networks) and may communicate the traffic to UE 401 via the air interface. In some embodiments, base station 101 may be, may include, and/or may be implemented by one or more gNBs 611.

RAN 612 may be, or may include, a LTE RAN that includes one or more base stations (e.g., one or more eNBs 613), via which UE 401 may communicate with one or more other elements of environment 600. UE 401 may communicate with RAN 612 via an air interface (e.g., as provided by eNB 613). For instance, RAN 612 may receive traffic (e.g., user plane traffic such as voice call traffic, data traffic, messaging traffic, signaling traffic, etc.) from UE 401 via the air interface, and may communicate the traffic to UPF/PGW-U 635 (e.g., via SGW 617) and/or one or more other devices or networks. Further, RAN 612 may receive signaling traffic, control plane traffic, etc. from UE 401 via the air interface, and may communicate such signaling traffic, control plane traffic, etc. to MME 616 and/or one or more other devices or networks. Additionally, RAN 612 may receive traffic intended for UE 401 (e.g., from UPF/PGW-U 635, MME 616, SGW 617, and/or one or more other devices or networks) and may communicate the traffic to UE 401 via the air interface. In some embodiments, base station 101 may be, may include, and/or may be implemented by one or more eNBs 613.

AMF 615 may include one or more devices, systems, Virtualized Network Functions ("VNFs"), Cloud-Native Network Functions ("CNFs"), etc., that perform operations to register UE 401 with the 5G network, to establish bearer channels associated with a session with UE 401, to hand off UE 401 from the 5G network to another network, to hand off UE 401 from the other network to the 5G network, manage mobility of UE 401 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 401 with the EPC, to establish bearer channels associated with a session with UE 401, to hand off UE 401 from the EPC to another network, to hand off UE 401 from another network to the EPC, manage mobility of UE 401 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 401. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 401, from DN 650, and may forward the user plane data toward UE 401 (e.g., via RAN 610, SMF/PGW-C 620, and/or one or more other devices). In some embodiments, multiple UPFs 635 may be deployed (e.g., in different geographical locations), and the delivery of content to UE 401 may be coordinated via the N9 ace (e.g., as denoted in FIG. 6 by the line marked "N9" originating and terminating at UPF/PGW-U 635). Similarly, UPF/PGW-U 635 may receive traffic from UE 401 (e.g., via RAN 610, RAN 612, SMF/PGW-C 620, and/or one or more other devices), and may forward the traffic toward DN 650. In some embodiments, UPF/PGW-U 635 may communicate (e.g., via the N4 ace) with SMF/PGW-C 620, regarding user plane data processed by UPF/PGW-U 635.

UDM/HSS 640 and AUSF 645 may include one or more devices, systems, VNFs, CNFs, etc., that manage, update, and/or store, in one or more memory devices associated with AUSF 645 and/or UDM/HSS 640, profile information associated with a subscriber. AUSF 645 and/or UDM/HSS 640 may perform authentication, authorization, and/or accounting operations associated with the subscriber and/or a communication session with UE 401.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 401 may communicate, through DN 650, with data servers, other UEs 401, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 401 may communicate.

Figure 7:
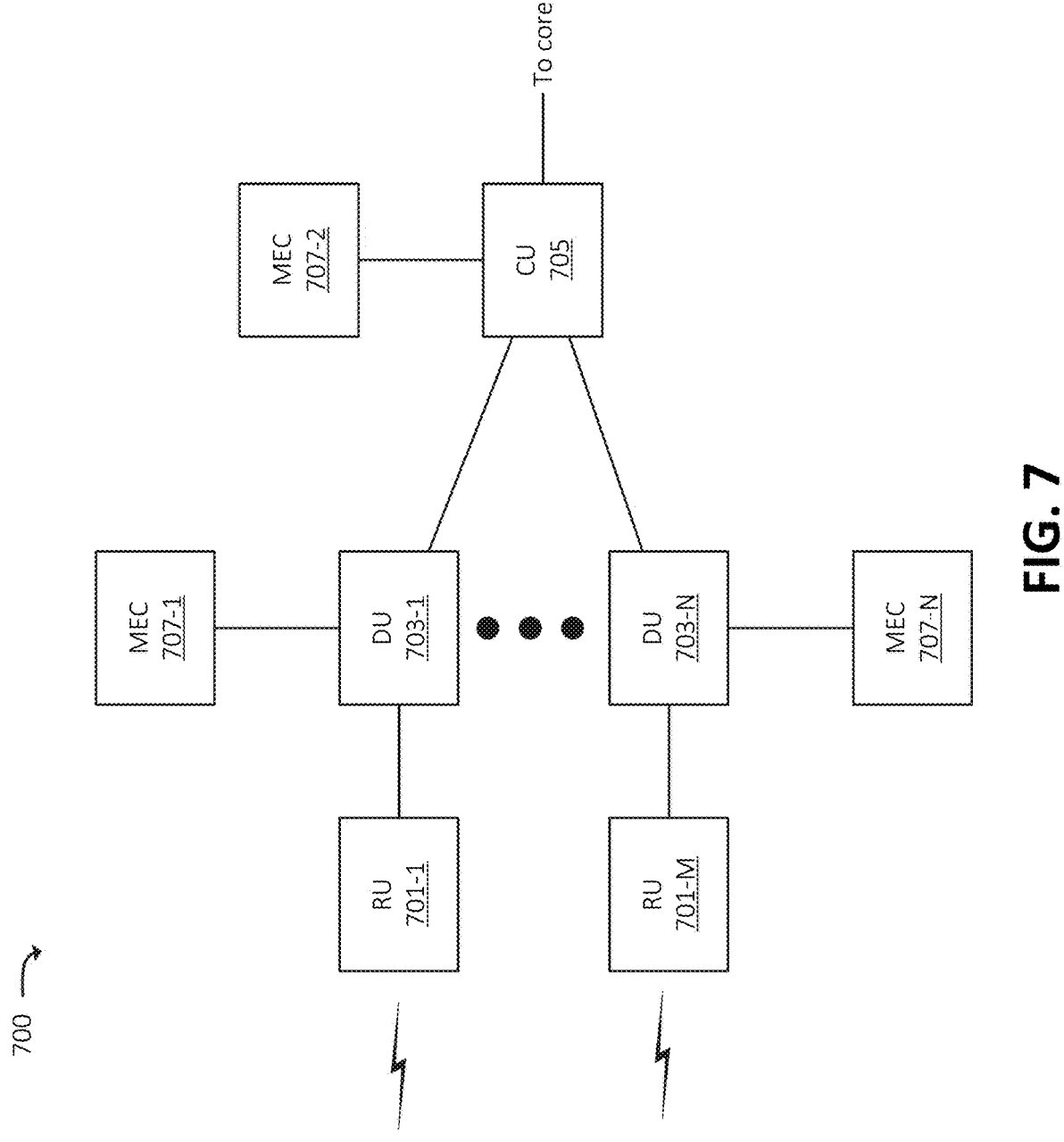
FIG. 7 illustrates an example arrangement of a radio access network ("RAN"), in accordance with some embodiments.

FIG. 7 illustrates an example RAN environment 700, which may be included in and/or implemented by one or more RANs (e.g., RAN 610, RAN 612, or some other RAN). In some embodiments, a particular RAN may include one RAN environment 700. In some embodiments, a particular RAN may include multiple RAN environments 700. In some embodiments, RAN environment 700 may correspond to a particular gNB 611 of a 5G RAN (e.g., RAN 610). In some embodiments, RAN environment 700 may correspond to multiple gNBs 611. In some embodiments, RAN environment 700 may correspond to one or more other types of base stations of one or more other types of RANs. As shown, RAN environment 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 401 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 401, and may determine which DU(s) 703 should receive the downlink traffic. DU 703 may include one or more devices that transmit traffic between a core network (e.g., via CU 705) and UE 401 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 401.

RU 701 may include hardware circuitry (e.g., one or more RF transceivers, antennas, radios, and/or other suitable hardware) to communicate wirelessly (e.g., via an RF interface)

with one or more UEs 401, one or more other DUs 703 (e.g., via RUs 701 associated with DUs 703), and/or any other suitable type of device. In the uplink direction, RU 701 may receive traffic from UE 401 and/or another DU 703 via the RF interface and may provide the traffic to DU 703. In the downlink direction, RU 701 may receive traffic from DU 703, and may provide the traffic to UE 401 and/or another DU 703.

One or more elements of RAN environment 700 may, in some embodiments, be communicatively coupled to one or more Multi-Access/Mobile Edge Computing ("MEC") devices, referred to sometimes herein simply as "MECs" 707. For example, DU 703-1 may be communicatively coupled to MEC 707-1, DU 703-N may be communicatively coupled to MEC 707-N, CU 705 may be communicatively coupled to MEC 707-2, and so on. MECs 707 may include hardware resources (e.g., configurable or provisionable hardware resources) that may be configured to provide services and/or otherwise process traffic to and/or from UE 401, via a respective RU 701.

For example, DU 703-1 may route some traffic, from UE 401, to MEC 707-1 instead of to a core network via CU 705. MEC 707-1 may process the traffic, perform one or more computations based on the received traffic, and may provide traffic to UE 401 via RU 701-1. In some embodiments, MEC 707 may include, and/or may implement, some or all of the functionality described above with respect to selecting bands for power saving techniques and/or one or more functions of AF 630, UPF 635, and/or one or more other devices, systems, VNFs, CNFs, etc. In this manner, ultra-low latency services may be provided to UE 401, as traffic does not need to traverse DU 703, CU 705, links between DU 703 and CU 705, and an intervening backhaul network between RAN environment 700 and the core network.

Figure 8:
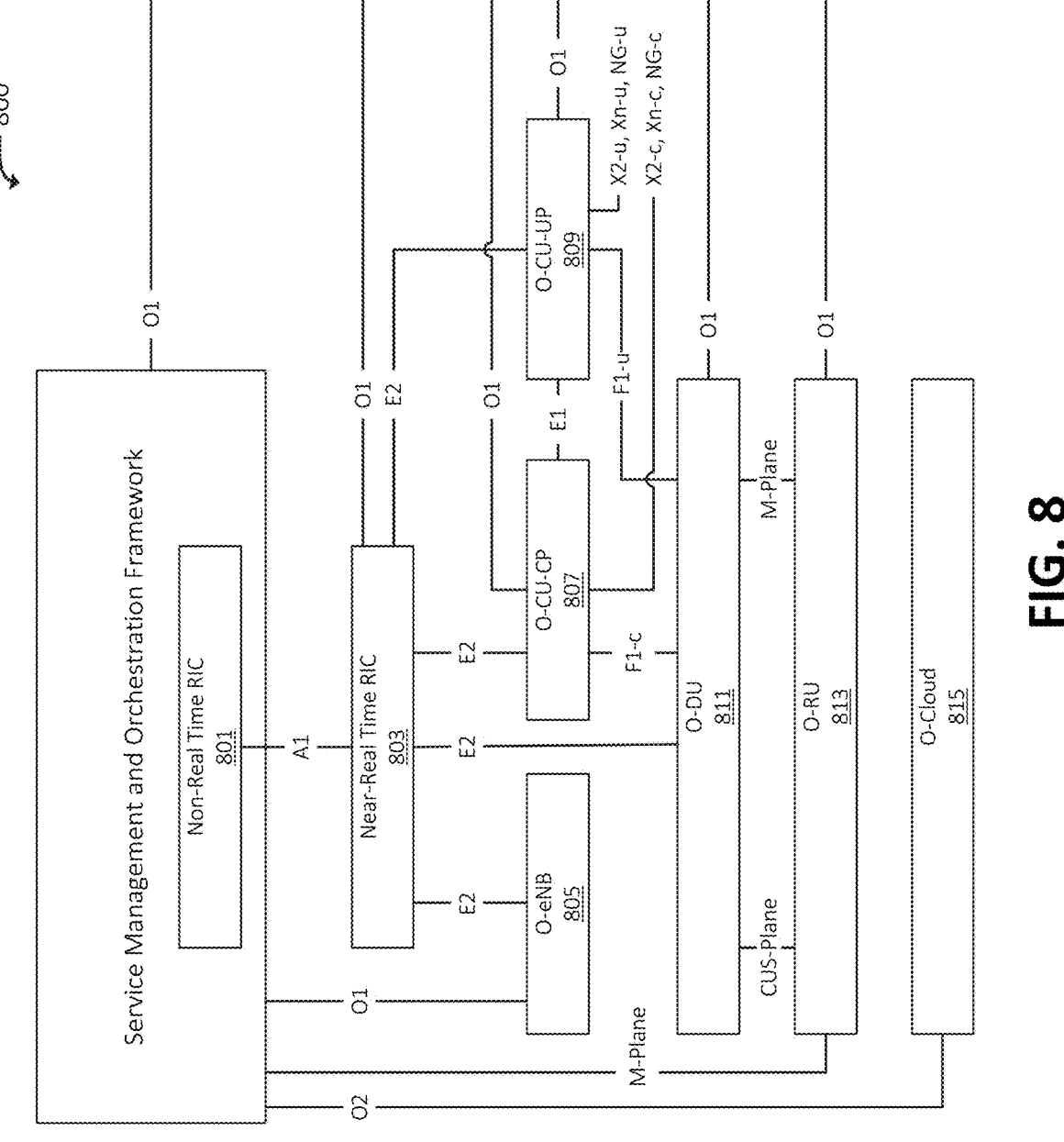
FIG. 8 illustrates an example arrangement of an Open RAN ("O-RAN") environment in which one or more embodiments, described herein, may be implemented.

FIG. 8 illustrates an example O-RAN environment 800, which may correspond to RAN 610, RAN 612, and/or DU network 700. For example, RAN 610, RAN 612, and/or DU network 700 may include one or more instances of O-RAN environment 800, and/or one or more instances of O-RAN environment 800 may implement RAN 610, RAN 612, DU network 700, and/or some portion thereof. As shown, O-RAN environment 800 may include Non-Real Time Radio Intelligent Controller ("RIC") 801, Near-Real Time RIC 803, O-eNB 805, O-CU-Control Plane ("O-CU-CP") 807, O-CU-User Plane ("O-CU-UP") 809, O-DU 811, O-RU 813, and O-Cloud 815. In some embodiments, O-RAN environment 800 may include additional, fewer, different, and/or differently arranged components.

In some embodiments, some or all of the elements of O-RAN environment 800 may be implemented by one or more configurable or provisionable resources, such as virtual machines, cloud computing systems, physical servers, and/or other types of configurable or provisionable resources. In some embodiments, some or all of O-RAN environment 800 may be implemented by, and/or communicatively coupled to, one or more MECs 707.

Non-Real Time RIC 801 and Near-Real Time RIC 803 may receive performance information (and/or other types of information) from one or more sources, and may configure other elements of O-RAN environment 800 based on such performance or other information. For example, Near-Real Time RIC 803 may receive performance information, via one or more E2 interfaces, from O-eNB 805, O-CU-CP 807, and/or O-CU-UP 809, and may modify parameters associated with O-eNB 805, O-CU-CP 807, and/or O-CU-UP 809 based on such performance information. In some embodiments, such parameters may include power save parameters, such as selecting particular bands for which power saving techniques should be implemented for given time periods. Similarly, Non-Real Time RIC 801 may receive performance information associated with O-eNB 805, O-CU-CP 807, O-CU-UP 809, and/or one or more other elements of O-RAN environment 800 and may utilize machine learning and/or other higher level computing or processing to determine modifications to the configuration of O-eNB 805, O-CU-CP 807, O-CU-UP 809, and/or other elements of O-RAN environment 800. In some embodiments, Non-Real Time RIC 801 may generate machine learning models based on performance information associated with O-RAN environment 800 or other sources, and may provide such models to Near-Real Time RIC 803 for implementation. Such machine learning models may include models relating to expected or predicted measures of load, performance, or hand-ins associated with a given RF band.

O-eNB 805 may perform functions similar to those described above with respect to eNB 613. For example, O-eNB 805 may facilitate wireless communications between UE 1uu and a core network. O-CU-CP 807 may perform control plane signaling to coordinate the aggregation and/or distribution of traffic via one or more DUs 703, which may include and/or be implemented by one or more O-DUs 811, and O-CU-UP 809 may perform the aggregation and/or distribution of traffic via such DUs 703 (e.g., O-DUs 811). O-DU 811 may be communicatively coupled to one or more RUs 701, which may include and/or may be implemented by one or more O-RUs 813. In some embodiments, O-Cloud 815 may include or be implemented by one or more MECs 707, which may provide services, and may be communicatively coupled, to O-CU-CP 807, O-CU-UP 809, O-DU 811, and/or O-RU 813 (e.g., via an O1 and/or O2 interface).

Figure 9:
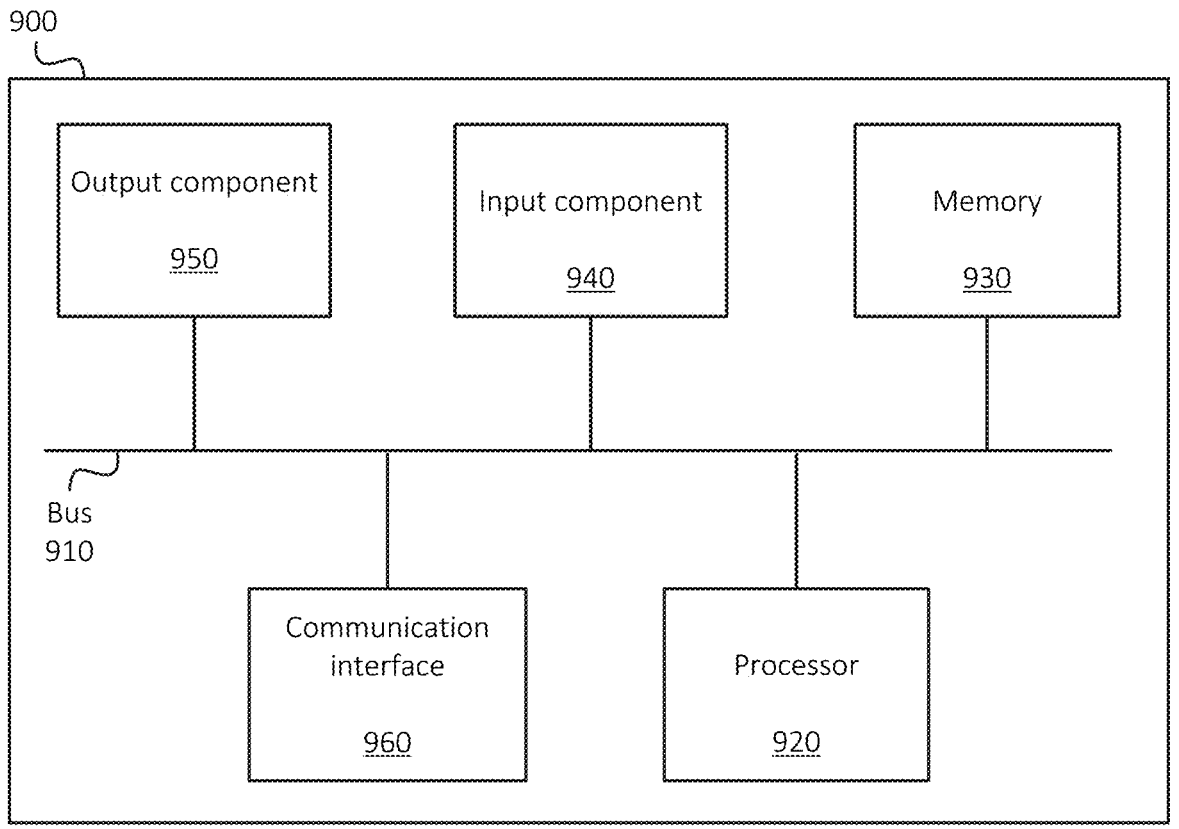
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing instructions, such as software instructions, processor-executable instructions, etc. stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

identify a plurality of radio frequency ("RF") bands implemented by a particular base station of a RAN of a wireless network;

identify a first measure of hand-ins, of a first plurality of User Equipment ("UEs") from one or more other base stations to the particular base station during a particular time period, via a first RF band of the plurality of bands;

identify a second measure of hand-ins, of a second plurality of UEs from one or more other base stations to the particular base station during the particular time period, via a different second RF band of the plurality of bands;

rank the first and second RF bands based on the respective associated first and second measures of hand-ins;

select a particular RF band, of the first and second RF bands, based on the ranking; and cause the particular base station to implement, during the particular time period, a power saving technique with respect to the selected particular RF band, of the first and second RF bands.

2. The device of claim 1, wherein the particular base station includes a first set of radios associated with the first RF band and a second set of radios associated with the second RF band, wherein the selected particular RF band is the first RF band, wherein implementing the power saving technique includes:

reducing a measure of power consumption associated with the first set of radios.

3. The device of claim 2, wherein reducing the measure of power consumption associated with the first set of radios includes at least one of:

setting the first set of radios to a low power mode, or setting the first set of radios to a no power mode.

4. The device of claim 1, wherein the one or more processors are further configured to:

identify a first measure of load, associated with the particular time period and the particular base station, via the first RF band; and identify a second measure of load, associated with the particular time period and the particular base station, via the second RF band, wherein selecting the particular RF band of the first and second RF bands is further based on the first and second measures of load.

5. The device of claim 1, wherein the first and second measures of hand-ins are predicted quantities of hand-ins.

6. The device of claim 5, wherein the predicted quantities of hand-ins are predicted using artificial intelligence/machine learning ("AI/ML") techniques.

7. The device of claim 1, wherein the particular base station further implements a third RF band, wherein the one or more processors are further configured to:

determine that the third RF band is associated with a policy indicating that the power save technique is not permitted for the third RF band, wherein selecting the particular RF band further includes forgoing selecting the third RF band based on the policy indicating that the power save technique is not permitted for the third RF band.

8. A non-transitory computer-readable medium, storing a plurality of processor-executable instructions to:

identify a plurality of radio frequency ("RF") bands implemented by a particular base station of a RAN of a wireless network;

identify a first measure of hand-ins, of a first plurality of User Equipment ("UEs") from one or more other base stations to the particular base station during a particular time period, via a first RF band of the plurality of bands;

identify a second measure of hand-ins, of a second plurality of UEs from one or more other base stations to the particular base station during the particular time period, via a different second RF band of the plurality of bands;

rank the first and second RF bands based on the respective associated first and second measures of hand-ins;

select a particular RF band, of the first and second RF bands, based on the ranking; and cause the particular base station to implement, during the particular time period, a power saving technique with respect to the selected particular RF band, of the first and second RF bands.

9. The non-transitory computer-readable medium of claim 8, wherein the particular base station includes a first set of radios associated with the first RF band and a second set of radios associated with the second RF band, wherein the selected particular RF band is the first RF band, wherein implementing the power saving technique includes:

reducing a measure of power consumption associated with the first set of radios.

10. The non-transitory computer-readable medium of claim 9, wherein reducing the measure of power consumption associated with the first set of radios includes at least one of:

setting the first set of radios to a low power mode, or setting the first set of radios to a no power mode.

11. The non-transitory computer-readable medium of claim 8, wherein the plurality of processor-executable instructions further include processor-executable instructions to:

identify a first measure of load, associated with the particular time period and the particular base station, via the first RF band; and identify a second measure of load, associated with the particular time period and the particular base station, via the second RF band, wherein selecting the particular RF band of the first and second RF bands is further based on the first and second measures of load.

12. The non-transitory computer-readable medium of claim 8, wherein the first and second measures of hand-ins are predicted quantities of hand-ins.

13. The non-transitory computer-readable medium of claim 12, wherein the predicted quantities of hand-ins are predicted using artificial intelligence/machine learning ("AI/ML") techniques.

14. The non-transitory computer-readable medium of claim 8, wherein the particular base station further implements a third RF band, wherein the plurality of processor-executable instructions further include processor-executable instructions to:

determine that the third RF band is associated with a policy indicating that the power save technique is not permitted for the third RF band, wherein selecting the particular RF band further includes forgoing selecting the third RF band based on the policy indicating that the power save technique is not permitted for the third RF band.

15. A method, comprising:

identifying a plurality of radio frequency ("RF") bands implemented by a particular base station of a RAN of a wireless network;

identifying a first measure of hand-ins, of a first plurality of User Equipment ("UEs") from one or more other base stations to the particular base station during a particular time period, via a first RF band of the plurality of bands;

identifying a second measure of hand-ins, of a second plurality of UEs from one or more other base stations to the particular base station during the particular time period, via a different second RF band of the plurality of bands;

ranking the first and second RF bands based on the respective associated first and second measures of hand-ins;

selecting a particular RF band, of the first and second RF bands, based on the ranking; and causing the particular base station to implement, during the particular time period, a power saving technique with respect to the selected particular RF band, of the first and second RF bands.

16. The method of claim 15, wherein the base station includes a first set of radios associated with the first RF band and a second set of radios associated with the second RF band, wherein the selected particular RF band is the first RF band, wherein implementing the power saving technique includes at least one of:

setting the first set of radios to a low power mode, or setting the first set of radios to a no power mode.

17. The method of claim 15, further comprising:

identifying a first measure of load, associated with the particular time period and the base station, via the first RF band; and identifying a second measure of load, associated with the particular time period and the base station, via the second RF band, wherein selecting the particular RF band of the first and second RF bands is further based on the first and second measures of load.

18. The method of claim 15, wherein the first and second measures of hand-ins are predicted quantities of hand-ins.

19. The method of claim 18, wherein the predicted quantities of hand-ins are predicted using artificial intelligence/machine learning ("AI/ML") techniques.

20. The method of claim 15, wherein the base station further implements a third RF band, the method further comprising:

determining that the third RF band is associated with a policy indicating that the power save technique is not permitted for the third RF band, wherein selecting the particular RF band further includes forgoing selecting the third RF band based on the policy indicating that the power save technique is not permitted for the third RF band.

* * * * *